US008346831B1

(12) United States Patent
Cai et al.

(10) Patent No.: US 8,346,831 B1
(45) Date of Patent: Jan. 1, 2013

(54) SYSTEMS AND METHODS FOR COMPUTING MATHEMATICAL FUNCTIONS

(75) Inventors: Mike M. Cai, Newark, CA (US); Lefan Zhong, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 1454 days.

(21) Appl. No.: 11/493,714

(22) Filed: Jul. 25, 2006

(51) Int. Cl.
*G06F 7/38* (2006.01)

(52) U.S. Cl. .................................................. 708/233

(58) Field of Classification Search .......... 708/200–209, 708/233, 500, 502
See application file for complete search history.

(56) References Cited

U.S. PATENT DOCUMENTS

| | | | | |
|---|---|---|---|---|
| 4,868,776 A * | 9/1989 | Gray et al. | ..................... | 708/405 |
| 5,163,017 A * | 11/1992 | Wong et al. | .................... | 708/406 |
| 5,473,558 A * | 12/1995 | Nakamura | ..................... | 708/603 |
| 6,341,300 B1 * | 1/2002 | Shankar et al. | ............... | 708/605 |
| 6,598,063 B1 * | 7/2003 | Tang et al. | ..................... | 708/606 |
| 6,976,043 B2 * | 12/2005 | Clifton | ......................... | 708/277 |
| 7,222,060 B2 * | 5/2007 | Shimizu et al. | ................. | 703/14 |
| 7,346,642 B1 * | 3/2008 | Briggs et al. | .................. | 708/497 |
| 7,640,285 B1 * | 12/2009 | Oberman et al. | ............. | 708/523 |
| 2003/0200237 A1 * | 10/2003 | Naoi | ............. | 708/233 |
| 2005/0071401 A1 * | 3/2005 | Clifton | ......................... | 708/290 |
| 2007/0073798 A1 * | 3/2007 | Donofrio et al. | .............. | 708/523 |

* cited by examiner

*Primary Examiner* — David H Malzahn
(74) *Attorney, Agent, or Firm* — David R. Stevens; Stevens Law Group

(57) ABSTRACT

Mathematical functions are computed using a single hardware pipeline that performs polynomial approximation of second degree or higher. The single hardware pipeline includes multiple stages. Several data tables are used on the computations. The data tables are associated with a reciprocal, square root, exponential, or logarithm function. The data tables include data associated with implementing the associated function. The single hardware pipeline computes at least one of the functions associated with the data tables.

14 Claims, 3 Drawing Sheets

SYSTEMS AND METHODS FOR COMPUTING MATHEMATICAL FUNCTIONS

BACKGROUND INFORMATION

1. Field of the Invention

The invention related generally to the field of computer systems and more particularly to computational functions for graphics processor chips.

2. Description of Related Art

Graphics processor chips traditionally employ various mathematical functions implemented in hardware for fast drawing and rendering speed. Some examples of these mathematical functions include reciprocal function ("RCP"), reciprocal square root function ("SQRT"), exponential function ("EXP") and logarithmic function ("LOG"). These mathematical functions are implemented in prior art as separate circuitry blocks with different algorithms.

For example, in a three cycle RCP implementation in the prior art, a floating point number x may be represented as a concatenation of a most significant bits ("MSB") portion x0 and a least significant bits ("LSB") portion x1 where x1=x−x0. The main calculation for reciprocal of x is in the calculation of mantissa. Mantissa is typically calculated in a two term function: $f(x)=a+b(x-x0)$ in the prior art, where a and b are data look up tables. In a typical example, where more than 21 bit precision is required for a graphics processor, there needs to be over 16,000 entries in each of the data look up tables a and b to achieve the required precision. This is based on a 14 bit x0 and data look up tables with $2^{14}$ entries each. The hardware implementation of such large data look up tables results in large gate counts proportional to the size of the data look up tables. Graphic processor chips may include hardware implementation of several mathematical functions. In prior art examples, each of these mathematical functions requires large gate count and is typically combined with other methods. It is common technique in the prior art to implement each of these mathematical functions with separate logic circuitry and separate large data look up tables. As high speed and mobile applications demand higher integration and lower power consumption, there are needs for an efficient algorithm to implement these various mathematical functions.

SUMMARY OF THE INVENTION

Broadly speaking, the embodiments of the present invention fill these needs by providing methods and apparatus for implementing various mathematical functions with unified hardware circuitry and data look up table with less than 1000 entries. It should be appreciated that the present invention can be implemented in numerous ways, including as a method, a system, or a device. Several inventive embodiments of the present invention are described below.

In an example, RCP may be implemented with an unified hardware in floating point for Vertex Shader and Pixel Shader in a mobile graphics chip. This technique is based on computing RCP ($F(x)=1/x$) using a unified hardware pipe that performs a quadratic approximation:

$$F(x)=a+b(x-x0)+C(x-x0)(x-x1);$$

where x is the mantissa of a single or double precision floating point number y, $y=(sign)(2)^w(x)$, $-126<=w<126$, and $1.0<=x<2.0$. Once F(x) is calculated, RCP(y) can be calculated as $1/y=(sign)(2)^{-w}(F(x))$. In some examples, the quadratic approximation may be done in 64 segments. A starting value x0 and ending value x1 of each of these 64 segments can be calculated as:

$$x0=1.0+i/64$$

$$x1=1.0+(i+1)/64;$$

where i is an integer from 0 to 63. For an arbitrary x, where $1.0<=x<2.0$ and x may fall in one of these 64 segments, i may be determined by matching the MSB portion of x to a particular x0. Accordingly, the value of x is between x0 and x1 ($x0<=x<x1$) and (x−x0) is the LSB of portion of x. Once i is determined, the value of a, b, and c may be determined from three separate data look up tables:

a=table[0][i]
b=table[1][i]
c=table[2][i];

and the RCP may be calculated based on the quadratic approximation $F(x)=a+b(x-x0)+C(x-x0)(x-x1)$.

In another example, SQRT ($F(x)=1/x^{\wedge}(1/2)$) may be implemented with the unified hardware with different data look up tables. Once F(x) is calculated, SQRT (y) can be calculated as:

$$1/sqrt(y)=(sign)(2)^{-w/2}(F(x)), \text{ if } w \text{ is even}$$

$$1/sqrt(y)=(sign)(2)^{-(w-1)/2}(F(x)), \text{ if } w \text{ is odd}$$

In yet another example, EXP ($F(x)=2^{\wedge}x$) may be implemented with the unified hardware with different data look up tables and a floating point to fixed point number conversion circuitry before the unified hardware pipe. The floating point to fixed point number conversion circuitry performs pre-processing to convert y to int_y and frac_y. Once F(frac_y) is calculated, EXP(y) can be calculated as $2^y=(2^{(int\_y)})$ (F(frac_y)).

In still another example, LOG ($F(x)=LOG\ 2(x)$) may be implemented with the unified hardware with different data look up tables and a floating point to fixed point number conversion circuitry after the unified hardware pipe. Once F(x) is calculated, LOG(y) can be calculated as $Log\_y=Log\ 2(y)=w+F(x)$. The floating point to fixed point number conversion circuitry then performs post-processing to convert Log_y to a floating point number.

Other examples and advantages of the invention will become apparent from the following detailed description, taken in conjunction with the accompanying drawings, illustrating by way of example the principles of the invention.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE INVENTION

Figure 1:
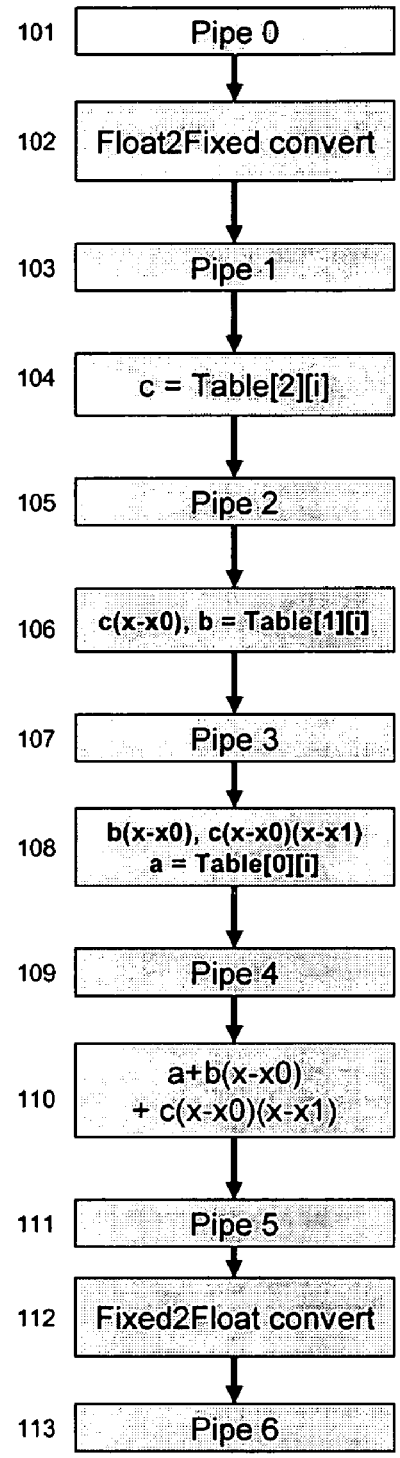
FIG. 1 is a block diagram illustrating a 6 stage unified hardware pipeline according to an embodiment of the present invention.

FIG. 1 is a block diagram illustrating a 6 stage unified hardware pipeline according to an embodiment of the present invention. Here, block 101, block 103, block 105, block 107, block 109, block 111, and block 113 are the register stages of the pipeline. Block 102 is a floating point to fixed point converter. Block 112 is a fixed point to floating point converter. In an example, block 112 may be configured to be bypassing circuit according to an opcode (i.e., a configuration instruction, a micro-code, or the like) for implementing an EXP function. In another example block 102 may be configured to be bypassing circuit according to another opcode (i.e., a configuration instruction, a micro-code, or the like) for implementing an LOG function. In still other examples, both block 102 and block 112 may be configured to be bypassing circuits according to yet another opcode (i.e., a configuration instruction, a micro-code, or the like) in implementing RCP or SQRT functions. In some examples, block 104, 106, 108, and 110 may implement various portions of the quadratic approximation for calculating mathematical functions such as RCP, SQRT, EXP, LOG or the like based on separate data look up tables. For example, block 104 implements data table look up for c based on an integer i corresponding to mantissa of a floating point number x. Likewise, block 106 implements data table look up for b. During the same pipeline stage, block 106 also calculates $c(x-x0)$. Similarly, block 108 implements data table look up for a as well as calculation of $b(x-x0)$ and $c(x-x0)(x-x1)$. Block 110 implements summation of three terms for calculating the quadratic approximation. The above description is not limited to the details described above and various modifications or alternations as made obvious by the above description may be made.

Figure 2:
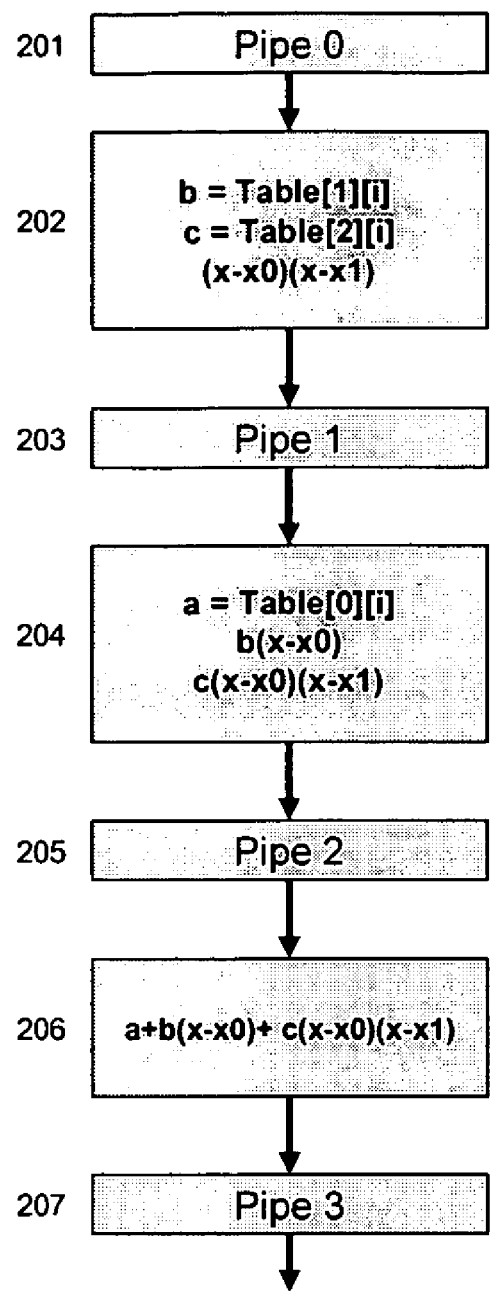
FIG. 2 is a block diagram illustrating a 3 stage RCP hardware pipeline according to an embodiment of the present invention.

FIG. 2 is a block diagram illustrating a 3 stage RCP hardware pipeline according to an embodiment of the present invention. Here, block 201, block 203, block 205, and block 207 are the register stages of the pipeline. In some examples, block 202, 204, and 206 may implement various portions of the quadratic approximation. For example, block 202 implements data table look up for b and c based on an integer i corresponding to MSB of mantissa of a floating point number. During the same pipeline stage, block 202 also calculates $(x-x0)(x-x1)$. Likewise, block 204 implements data table look up for a as well as calculation of $b(x-x0)$ and $c(x-x0)(x-x1)$. Block 206 implements summation of three terms for calculating the quadratic approximation. The above description is not limited to the details described above and various modifications or alternations as made obvious by the above description may be made.

Figure 3:
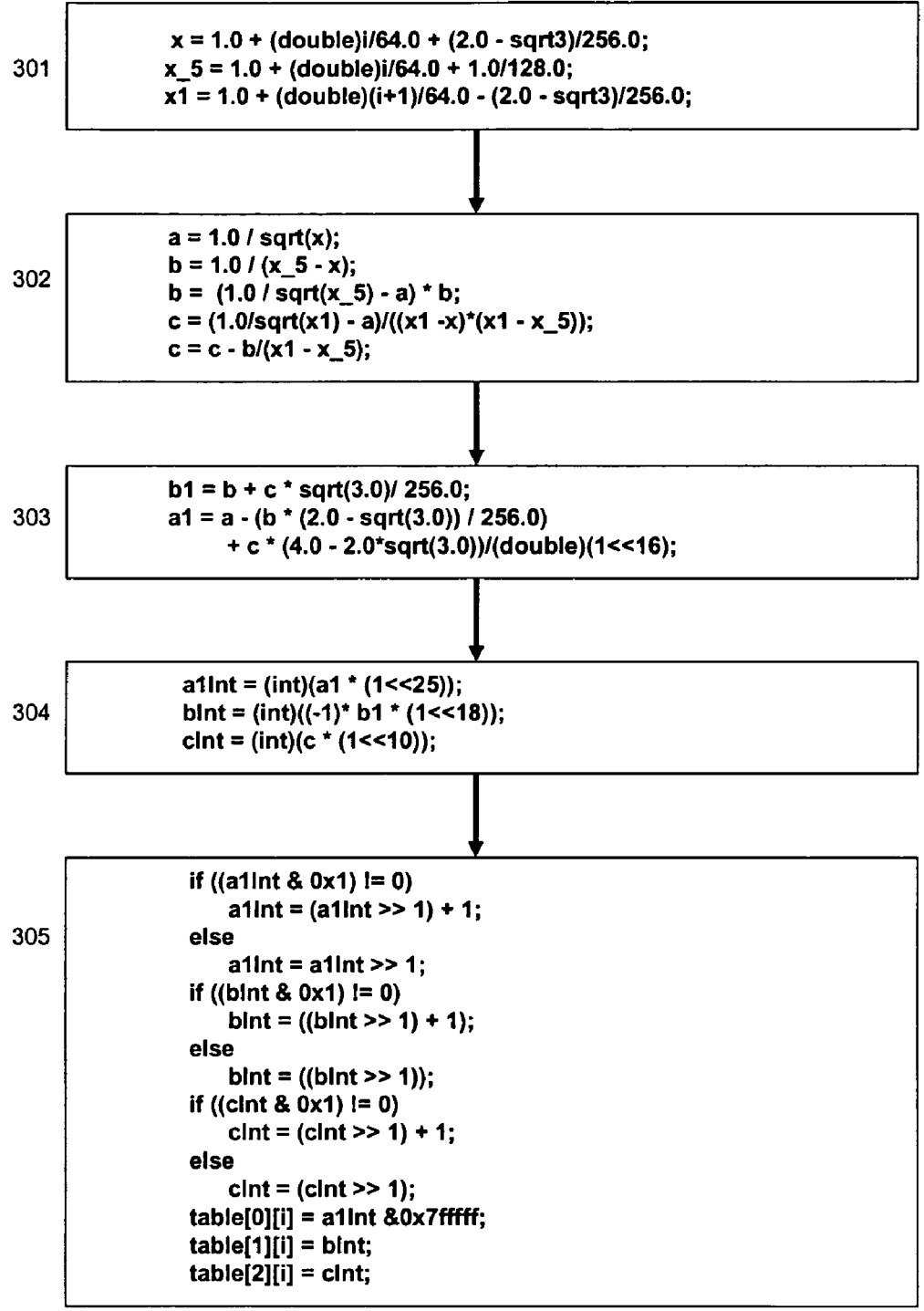
FIG. 3 is a flow chart diagram illustrating an algorithm for calculating various exemplary data look up table according to an embodiment of the present invention.

FIG. 3 is a flow chart diagram illustrating an exemplary algorithm for calculating various data look up tables according to an embodiment of the present invention. Here, an exemplary algorithm is illustrated for computing data tables a, b and c for SQRT. In this example, table[0][i]=a, table[1][i]=b and table[2][i]=c. Three linear equations are used to compute three values a, b and c. These three equations are solved by first computing the start point (i.e., x), middle point (i.e., x_5) and end point (i.e., x1) of a segment (301). Blocks 302 and 303 compute a, b and c in floating point format. Block 304 converts a, b and c to integer format. Block 305 does the rounding and produces the final value. As another example, the "sqrt" function in block 302 may be replaced by reciprocal function to adapt the algorithm for computing data tables a, b and c for RCP. In other examples, the "sqrt" function in block 302 may be replaced by other functions (e.g., EXP, LOG, or the like) to adapt the algorithm for computing data tables a, b and c for these other functions. The above description is not limited to the details described above and various modifications or alterations as made obvious by the above description may be made.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. An apparatus for computing mathematical functions, the apparatus comprising:
   a single hardware pipeline configured to perform a polynomial approximation of second degree or higher, the single hardware pipeline including a plurality of stages; and
   a plurality of data tables, each associated with at least one of an RCP (reciprocal), SQRT (square root), EXP (exponential) and LOG (logarithm) function and configured to be coupled to the single hardware pipeline according to at least one opcode, wherein each of the plurality of data tables includes data associated with implementing the associated function, and wherein the single hardware pipeline is further configured to compute at least one of the RCP, SQRT, EXP and LOG functions;
   wherein the polynomial approximation is of the form $F(x)=a+b*(x-x0)+c*(x-x0)*(x-x1)$, where $F(x)$ is an intermediate value used in the single hardware pipeline, x is an operand, x0 is a value greater than the operand, x1 is a value smaller than the operand, and values a, b, and c correspond to the values x0 and x1 and are retrieved from the plurality of data tables as coupled to the single hardware pipeline according to the at least one opcode.

2. The apparatus of claim 1, wherein the polynomial approximation is a quadratic approximation.

3. The apparatus of claim 1, wherein at least one of the plurality of stages is operable to be coupled to at least one of the plurality of data tables.

4. The apparatus of claim 1, wherein each of the plurality of stages is operable to compute at least one term of the polynomial approximation.

5. The apparatus of claim 1, wherein a first stage is operable to convert a floating point representation to a fixed point representation.

6. The apparatus of claim 1, wherein a second stage is operable to convert a fixed point representation to a floating point representation.

7. A method comprising:
   identifying a first data table corresponding to at least one of a plurality of data tables, each data table associated with at least one of an RCP (reciprocal), SQRT (square root), EXP (exponential) and LOG (logarithm) function, wherein each of the data tables includes data associated with implementing the associated function;
   identifying a second data table corresponding to at least one of a plurality of data tables, each data table corresponding to at least one of the RCP, SQRT, EXP and LOG functions;
   performing, in a single hardware pipeline, a first polynomial approximation based on the first data table;

performing, in the single hardware pipeline, a second polynomial approximation based on the second data table; and summing, in the single hardware pipeline, the first and second polynomial approximations to generate an output associated with at least one of the RCP, SQRT, EXP and LOG functions;

wherein the first and second polynomial approximations are of the form $F(x)=a+b*(x-x0)+c*(x-x0)*(x-x1)$, where $F(x)$ is an intermediate value used in the single hardware pipeline, x is an operand, x0 is a value greater than the operand, x1 is a value smaller than the operand, and values a, b, and c correspond to the values x0 and x1 and are retrieved from the plurality of data tables as coupled to the single hardware pipeline according to the at least one opcode.

8. The method of claim 7 wherein the first polynomial approximation is of second degree or higher.

9. The method of claim 7 wherein the second polynomial approximation is of second degree or higher.

10. The method of claim 7 wherein the first polynomial approximation is a quadratic approximation.

11. The method of claim 7 wherein performing a first polynomial approximation includes a plurality of stages, each of the plurality of stages computing at least one term of the first polynomial approximation.

12. The method of claim 7 wherein performing a first polynomial approximation includes a plurality of stages, each of the plurality of stages computing at least one term of a quadratic approximation.

13. The method of claim 7 wherein performing a first polynomial approximation includes a plurality of stages, at least one of the plurality of stages converting a floating point representation to a fixed point representation.

14. The method of claim 7 wherein performing a first polynomial approximation includes a plurality of stages, at least one of the plurality of stages converting a fixed point representation to a floating point representation.

\* \* \* \* \*